(12) United States Patent
Price (10) Patent No.: US 9,876,973 B2
(45) Date of Patent: Jan. 23, 2018

(54) OPTICAL MODULE AND METHOD

(71) Applicant: STMicroelectronics (Research & Development) Limited, Buckinghamshire (GB)

(72) Inventor: Andy Price, Bonnyrigg (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 0 days.

(21) Appl. No.: 14/980,384

(22) Filed: Dec. 28, 2015

(65) Prior Publication Data

US 2016/0112666 A1    Apr. 21, 2016

Related U.S. Application Data

(63) Continuation-in-part of application No. PCT/EP2014/068768, filed on Sep. 3, 2014.

(30) Foreign Application Priority Data

Sep. 3, 2013 (GB) .................................. 1315669.0

(51) Int. Cl.
| | |
|---|---|
| *H04N 5/3745* | (2011.01) |
| *H04N 5/232* | (2006.01) |
| *H04N 5/357* | (2011.01) |
| *H04N 13/00* | (2006.01) |
| *H04N 13/02* | (2006.01) |
| *G06T 7/80* | (2017.01) |

(52) U.S. Cl.
CPC ........... *H04N 5/37455* (2013.01); *G06T 7/80* (2017.01); *H04N 5/23225* (2013.01); *H04N 5/357* (2013.01); *H04N 13/0025* (2013.01); *H04N 13/0296* (2013.01)

(58) Field of Classification Search
CPC ........... H04N 5/23225; H04N 1/00002; G03B 43/00; G06T 7/0018; G01R 31/275; G01R 31/2851
USPC ..................................... 348/207.11, 180, 187
See application file for complete search history.

(56) References Cited

U.S. PATENT DOCUMENTS

| | | | |
|---|---|---|---|
| 2003/0090580 A1 | 5/2003 | Petropoulos et al. | |
| 2005/0099516 A1* | 5/2005 | Kagle ................... | H04N 5/367 348/246 |
| 2006/0055793 A1 | 3/2006 | Adler et al. | |
| 2009/0213250 A1 | 8/2009 | Alakarhu et al. | |
| 2009/0273679 A1* | 11/2009 | Gere ..................... | H04N 9/045 348/187 |
| 2010/0271489 A1 | 10/2010 | Muukki | |
| 2012/0314086 A1* | 12/2012 | Hubel .................. | H04N 17/002 348/175 |

* cited by examiner

*Primary Examiner* — Kelly L Jerabek
(74) *Attorney, Agent, or Firm* — Seed IP Law Group LLP (57) ABSTRACT

An optical module for use in a device includes an array of pixels configured to capture image data and a memory. The memory is configured to store identification information associated with said optical module. The identification information enables retrieval of information for controlling said optical module from a source outside said device.

15 Claims, 5 Drawing Sheets

OPTICAL MODULE AND METHOD

BACKGROUND

Technical Field

Some embodiments relate to an optical module, a device incorporating an optical module and a method.

Description of the Related Art

Devices such as mobile phones, digital cameras and other similar devices may incorporate solid state image sensors.

Image sensors using pinned photodiode pixels, for example implemented in CMOS architecture, are known. Such image sensors may have both the image sensing element (pixels) and the image processing circuitry included in a chip or chipset which can be manufactured using CMOS techniques. There is a trend for the arrays of pixels to become larger. There is a desire for the image quality to be improved by for example using calibration information.

BRIEF SUMMARY

According to an aspect, there is provided an optical module for use in a device comprising: an array of pixels configured to capture image data; and a memory, said memory configured to store identification information associated with said optical module, said identification information enabling retrieval of information for controlling said optical module from a source outside said device.

The identification information may uniquely identify said optical module.

The identification information may comprise a code.

The array of pixels may comprise an array of photodiodes.

The memory may comprise a non-volatile memory.

In some embodiments, said optical module may comprise an integrated circuit, a chip set, a die or a set of dies.

According to another aspect, there is provided a camera comprising an optical module as described above.

According to another aspect, there is provided a device comprising an optical module described above and a memory, said memory configured to store said information for controlling said optical module.

The information for controlling said optical module may comprise calibration data.

The information for controlling said optical module may comprise one or more of the following:

Voltage to be used during operation of the array;
Information on faulty pixels;
Information defining how the array responds to changes in temperature;
Information defining how the optical module responds to changes in colour temperature of illumination;
Information on shading and vignetting of the optical module;
Information on colour shading of said optical module;
Information on optical distortion of the optical module;
Information of an offset of an optical axis of the optical module;
Information on a dark current of the optical module;
Information on a dark current shading of the optical module;
Information on image stitching requirements;
Information on depth mapping; and
Information on stereoscopic alignment.

According to another aspect, there is provided a method comprising: accessing from a memory of an optical module identification information associated with said component; causing the obtaining of control information associated with said identification information, said control information for controlling the optical module; and storing said control information in a memory of a device in which said optical module is provided.

According to another aspect, there is provided a method comprising: receiving from a memory of an optical module identification information associated with said optical module; and providing control information associated with said identification information, said control information for controlling the optical module.

The optical module may be as described above.

The information for controlling said optical module may comprise calibration data.

The information for controlling said optical module may comprise one or more of the following:

Voltage to be used during operation of the array;
Information on faulty pixels;
Information defining how the array responds to changes in temperature;
Information defining how the optical module responds to changes in colour temperature of illumination;
Information on shading and vignetting of the optical module;
Information on colour shading of said optical module;
Information on optical distortion of the optical module;
Information of an offset of an optical axis of the optical module;
Information on a dark current of the optical module;
Information on a dark current shading of the optical module;
Information on image stitching requirements;
Information on depth mapping; and
Information on stereoscopic alignment.

According to another aspect, there is provided an apparatus comprising: means for receiving from a memory of an optical module identification information associated with said optical module; and means for providing control information associated with said identification information, said control information for controlling the optical module.

According to another aspect, there is provided an apparatus comprising: an interface configured to receive from a memory of an optical module identification information associated with said optical module; and one or more processors configured to provide control information associated with said identification information to said interface for output, said control information configured to control the optical module. A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE SEVERAL VIEWS OF THE DRAWINGS

For a better understanding of some embodiments, reference is now made by way of example only to the accompanying drawings in which.

DETAILED DESCRIPTION

Figure 1:
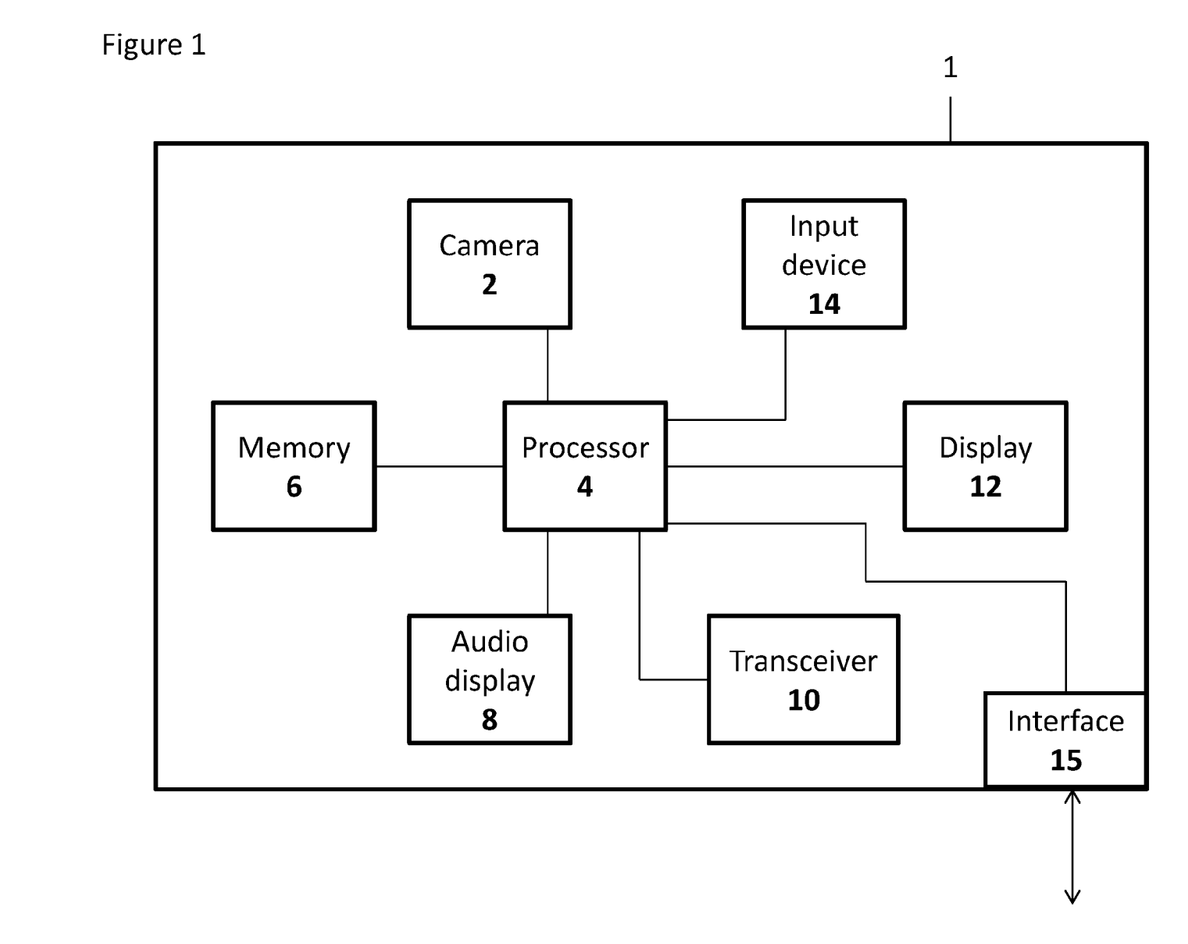
FIG. 1 shows schematically part of an electronics device in which some embodiments may be provided.

Reference is made to FIG. 1 which shows a device 1. The device 1 is, in this embodiment, a mobile phone. However, it should be appreciated that embodiments may be used in any other suitable device incorporating a camera. The device may be a camera, a smart phone, a tablet device or any other suitable device. Some embodiments may be used with stand-alone cameras.

The mobile phone 1 has a processor 4. The processor 4 is configured to control a display 12. The processor 4 is also configured to control an audio function 8. The audio function 8 may comprise a speaker and/or microphone and associated electronics. The processor 4 is configured to communicate with a transceiver 10. The transceiver 10 is configured to cause signals to be transmitted and to process received signals. The transceiver 10 may be coupled to an antenna. The transceiver 10 may carry out processing on the received signals and/or transmitted signals. For example, the transceiver 10 may down convert radio-frequency signals to baseband and/or convert baseband signals to radio-frequency for transmission. The processor 4 is also configured to receive an input from an input device 4. The input device may be a keyboard and/or touchscreen or the like. The processor 4 is also configured to communicate with a memory 6. The memory 6 may is further configured to store configuration information for controlling the optical module. Hence, the memory 6 may further be referred to as the configuration information memory 6. The processor 4 is configured to communicate with a camera 2. The device 1 further comprises an interface 15 for communication with external equipment such as servers. The device 1 may transmit identification information and receive configuration information via this interface 15.

It should be appreciated that the processor 4 may comprise a single processor or a set of processors. Likewise, the memory may comprise a single memory or a set of memories 6.

The camera may be an optical module or include an optical module.

Figures 2, 3:
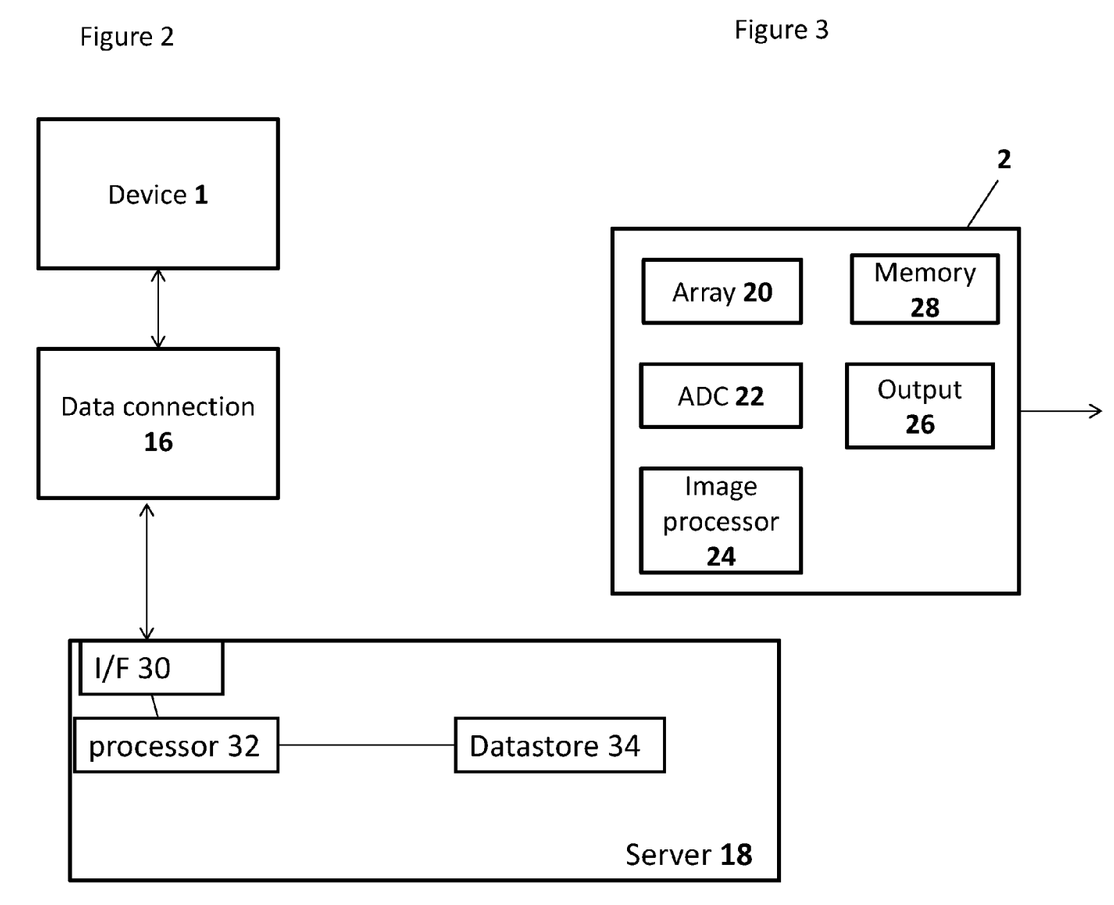
FIG. 2 shows the device of FIG. 1 coupled to a data server.
FIG. 3 shows a first example of a camera used in the device of FIG. 1.

Reference is made to FIG. 3 which shows schematically the camera 2 of FIG. 1. The camera 2 is provided on a single chip or die. The camera comprises an array 20 of pixels. The array 20 of pixels comprises light sensitive photo diodes which are configured to capture an image. Alternatively or additionally the array may capture other information such as distance information and/or light level information.

The captured image from the array 20 is in the analogue domain and is converted to the digital domain by an analogue to digital converter ADC 22. The camera 2 comprises an image processor 24 which is configured to process the captured image. The image processing may comprise one or more of colour processing, data formatting, compression and the like. The camera 2 has an output 26 which is configured to provide an output image. The output image may be a still image or a video image. The chip or die is also provided with a non-volatile memory 28 for permanent data storage. In some embodiments, the image processor function may be at least partially or completely omitted from the chip or die providing the camera or optical module and instead be provided by the device in which the optical module or camera is incorporated.

Figure 4:
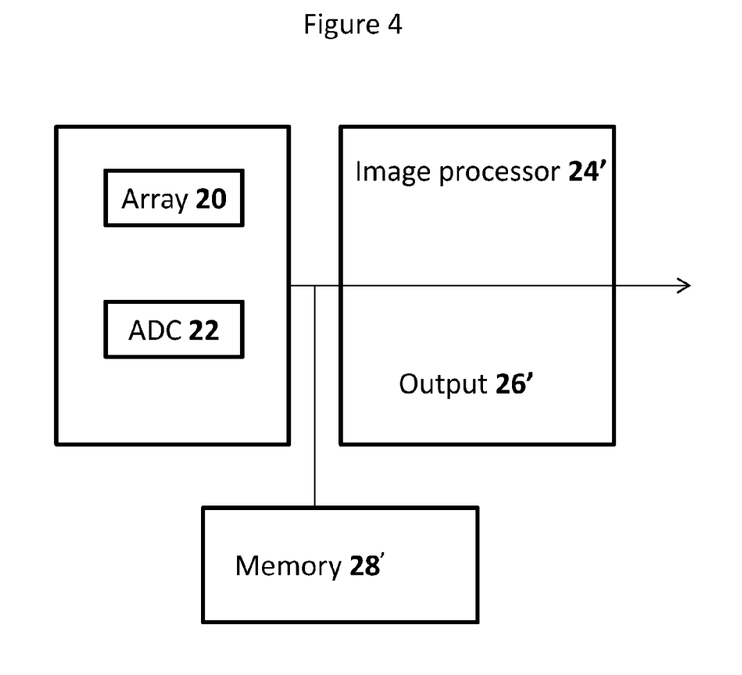
FIG. 4 shows a second example of a camera used in the device of FIG. 1.

FIG. 4 shows an alternative embodiment. In this embodiment, the camera 2 comprises a three chip or die arrangement. On one chip or die, the pixel array 20' is provided along with the analog to digital converter 22'. On the second die or chip, the image processor 24', and output 26' are provided. The three chips or die are arranged to communicate. A memory 28' is provided on a third die. In some embodiments, the camera or optical module may be regarded as being provided by the die or chip having the array and ADC and the chip or die having the memory. The image processor and output may be provided by the device in which the camera or optical module is incorporated.

In some embodiments, a dual die or chip arrangement may be provided. The memory may be provided on one or other of the dies shown in FIG. 4.

There is an increasing trend for more individual calibration of cameras for, for example, mobile phones. It should be appreciated that the demand for arrays with ever increasing numbers of pixels has meant that the amount of calibration information required may be increased. The requirement for increasing amounts of calibration data may be in order to satisfy demands for increased image quality.

There is an increasing trend for each individual camera provided in a mobile phone or the like to be individually calibrated. This is a result of the demand for increased image quality Currently, the calibration data is stored in the camera in a non-volatile memory. This is read by the image processor at camera boot time and the appropriate image quality setting changes are made. However, as the demands for increasing image quality and individual calibration of the camera increases, more and more calibration data is being used. By way of example only, a few years ago less than 100 bits of data may have been stored in the memory of the camera. Now, data of the order of kbits may be used.

Non-volatile memory is, in some embodiments, not particularly efficient in terms of silicon area and programming time for larger memories, which may be used in order to accommodate the larger quantity of calibration values.

Typically, cameras such as discussed previously are integrated into devices which have a relatively high level of permanent data storage. Accordingly, in some embodiments, the non-volatile memory 28 in the camera chip of FIG. 3 or memory 28' of FIG. 4 is configured to store identity information. The identity information can take any suitable form and may for example be a unique serial number. In some embodiments, the identity information is unique to the chip or die. In other embodiments, the identity information may identify a batch with which the chip or die is associated.

Reference is made to FIG. 2. As shown in FIG. 2, the device 1, during the phone build stage is configured such that the identification information is read from the memory 28 or 28' of the camera. The device may be connected via a data connection 16 to a server 18. The server may be a local server or a remote server. Accordingly, the data connection can take any suitable form such as a wired or wireless connection. In some embodiments, the data connection may be an Internet or similar connection. In some embodiments, the identification information is downloaded from the camera to a further device and that further device is configured to connect to the server 18 via the data connection.

The server 18 has an interface 30. The interface receives the identification information and will output the calibration data. The server has one or more processors 32 which in response to receiving the identification information will use that identification information to access one or more data stores 34 to retrieve the associated calibration information. Responsive to receiving the identification information, the server 18 will thus provide calibration data associated with that identification number.

The memory may be a memory in the server or separate from the server.

The calibration data is then stored in the memory of the device, for example memory 6. The calibration data may be used by the image signal processor to correct for part to part variation of the image. The image signal processor may be on the camera, but more commonly it is in the baseband or separate hardware accelerator.

The data may be received directly by the device or may be via a further device. Thus the memory in the camera need only be relatively small. This is because in some embodiments, the camera memory only needs to store the identification information with the calibration information being stored in another memory of the device.

Figure 5:
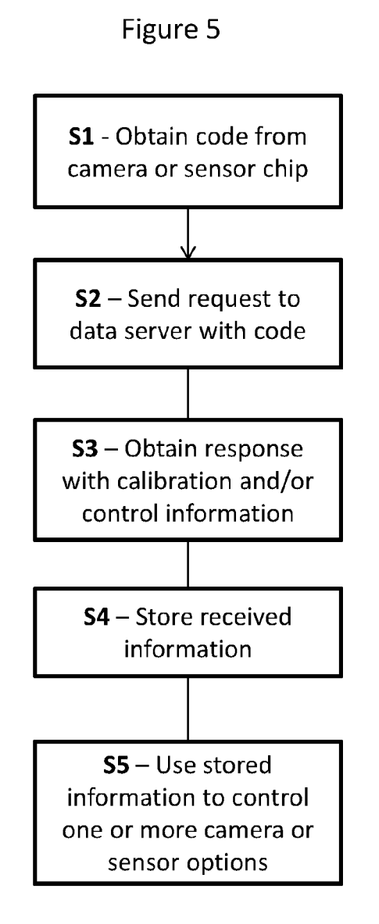
FIG. 5 shows a method of an embodiment.

Reference is made to FIG. 5 which describes a method in more detail.

In step S1, the code or identification information is obtained from the camera or sensor chip.

In step S2, a request is sent to a data server with the code. This may be via the data connection 16.

In step S3, a response is obtained with the calibration and/or control information.

In step S4, the received information is stored in the memory 6.

In step S5, the stored calibration information is used to control one or more of the camera or sensor options.

It should be appreciated that the obtaining of the code from the camera may be responsive to the building of the device.

In some embodiments, a request for the code may be received from the server and the code or identification information is sent as a response to that request.

In some embodiments, the request for the code may be generated by and/or received from one or more entities in the device incorporating the camera or optical module.

Some embodiments may provide one or more the following advantages.

The amount of non-volatile memory space on the camera chip or chips may be reduced.

Some embodiments may have a reduced test time as test results from a particular camera chip may be fully processed off line to provide more accurate calibration information. For example, the individual chip may be subject to test data and responsive to analysis of that test data, the appropriate calibration for that camera may be determined off line. Alternatively and/or additionally, test time may be reduced by programming the unique serial number in parallel to the calculation of the other parameters. Some embodiments may have a reduced non-volatile memory programming time.

Figure 6:
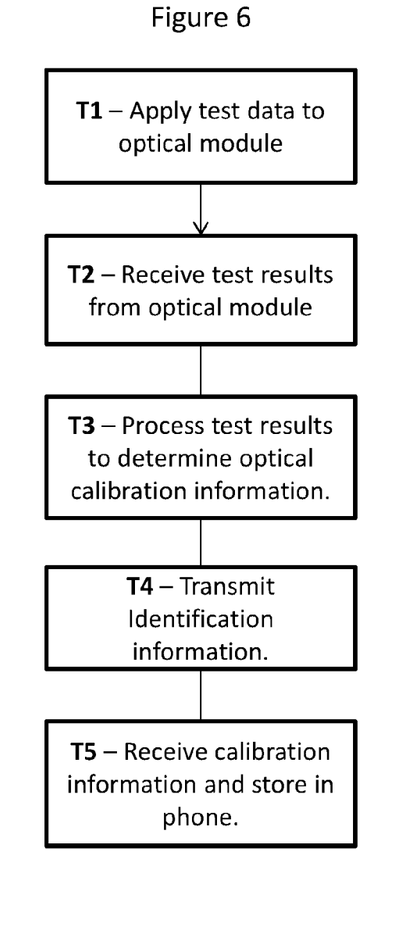
FIG. 6 shows steps that may be carried out for each individual optical module to determine and store the unique calibration information for each optical module in its corresponding device.

With reference to FIG. 6, the following steps may be carried out for each individual optical module to determine and store the unique calibration information for each optical module in its corresponding device:

In step T1, test data is applied to an optical module.

In step T2, in response to the applied test data, test results are received from the optical module.

In step T3, the test results are processed to determine accurate calibration information, which is then stored in a datastore until requested. Identification information identifying the optical module to which the calibration information corresponds is also stored alongside the calibration information.

In step T4, at the phone build stage, the phone loads the identification information from the memory of the optical module. This information is transmitted to the datastore holding the calibration information.

In step T5, the datastore matches the received identification information to the corresponding calibration information and then transmits the calibration information to the phone. This calibration information is then stored in a memory of the phone.

Figure 8:
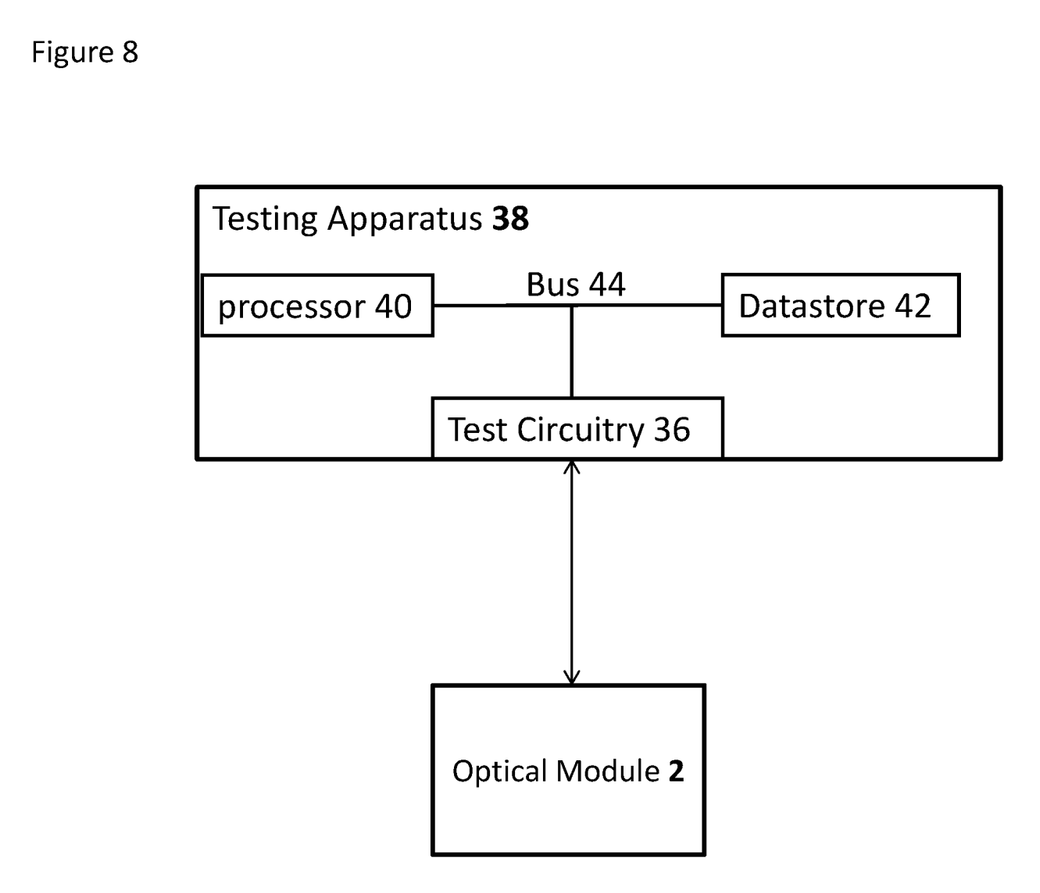
FIG. 8 shows an apparatus that may be used to achieve the process of FIG. 6.

The apparatus that may be used to achieve this process is shown in FIG. 8. The testing apparatus 38 comprises test circuitry 36, a processor 40, and a data store 42, each of which are connected via a bus 44. The test circuitry 36 applies the test data to the optical module 2, and receives the test results in response. The processor 40 of the apparatus 38 then performs processing with regard to the test results to obtain the calibration information, which is then stored in the data store 42. It should be appreciated that the schematic shown in FIG. 8 is an example only, and any suitable equipment for applying test data, and receiving and processing the results may be employed.

It may therefore be appreciated that at least some embodiments possess the advantage that the calibration information can be determined after the testing stage, thus not requiring a connection with the optical module to be maintained during processing of the test results. If, on the other hand, the calibration information were to be stored in a memory of the optical module, this would benefit from a lengthier testing stage, since the optical module should remain capable of receiving calibration information from a data store until the calibration information has been determined and has been transferred.

Some embodiments may allow the storing of relatively large calibration data sets enabling more complex image sensor processing.

Some embodiments may support multiple aperture technologies and/or light field cameras.

Some embodiments may enable fully mapped pixel by pixel calibration.

In some embodiments the calibration data set may comprise one or more image frames.

Some embodiments allow for the update of calibration information for the camera after the camera test. This may even be after the device has been sold. In other words, the ability to provide patches is improved. In some embodiments, the cellular communication network infrastructure may be used to download patches to the device after the device has been sold and are in use.

Figure 7:
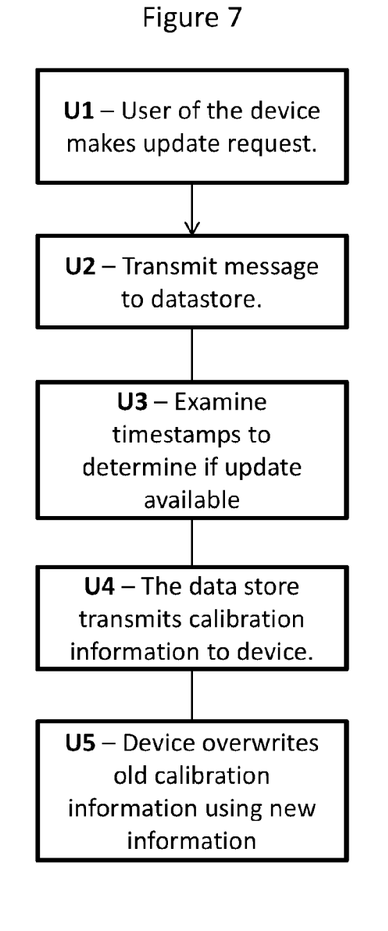
FIG. 7 shows steps that may be performed during updating/patching of the calibration information.

With reference to FIG. 7, the following steps may be performed during updating/patching of the calibration information:

In step U1, the user may input into a mobile device a request for an update of the calibration information.

In step U2, a message is transmitted to a datastore containing calibration information. The message contains a request for updated calibration information, a time stamp providing information as to when the calibration information of the user's device was last updated, and identification information associated with the optical module of the user's device.

In step U3, the datastore determines if a new set of calibration information (i.e. a new patch) has become available for the user's device. This is determined by examining the timestamp sent in the message and comparing it to a timestamp in the datastore recording when an update last became available. In step U4, if an update is available for the user's device, the datastore retrieves the calibration information associated with the identification information of the device's optical module. This further calibration information is then transmitted to the user's device.

In step U5, when the calibration information is received at the device, it is used to overwrite the old calibration information stored in the memory. It may then be used to calibrate the optical module. In an alternative embodiment, the further calibration information may not overwrite the old calibration information, but may be stored along with the old calibration in the same memory, or in a different memory.

As the identification information is unique, changes to the camera or any related subcomponents may be tracked.

The calibration or control information may improve the quality and/or performance of the camera.

The calibration or control information can be any suitable information and may be one or more of the following:

Voltage to be used during operation of the array;
Information on any faulty pixels;
Information defining how the array responds to changes in temperature;
Information defining how the optical module responds to changes in the colour temperature of the illumination;
Information on shading and vignetting of the optical module;
Information on the colour shading of the optical module;
Information on the optical distortion of the optical module;
Information of the offset of the optical axis of the optical module;
Information on the dark current of the optical module;
Information on the dark current shading of the optical module;
Information on the image stitching for multi-aperture optical modules;
Information on the depth mapping for light field optical modules;
Information on alignment for stereoscopic optical module; and
Any other information related to the performance variation of the optical module.

In some embodiments, the calibration control information may be used by the image signal processor to correct for part by part variations in the camera.

In some embodiments the image signal processor may need to access the data from the phone memory. The calibration data may be loaded into the image signal processor when the system is initiated and/or booted and then subsequently applied to the images as they are streamed.

Embodiments have been described in relation to a camera. It should be appreciated that other embodiments may be used with any other suitable device having an array of pixels on a die or chip. Suitable devices may comprise ranging devices ambient light detection and/or navigation devices.

An appropriately adapted computer program code product or products may be used for implementing the embodiments, when loaded or otherwise provided on an appropriate data processing apparatus. The program code product for providing the operation may be stored on, provided and embodied by means of an appropriate nontransitive carrier medium. An appropriate computer program can be embodied on a nontransitive computer readable record medium.

Whilst this detailed description has set forth some embodiments of the present invention, the appending claims cover other embodiments of the present invention which differ from the described embodiments according to various modifications and improvements. Other applications and configurations may be apparent to the person skilled in the art.

The invention claimed is:

1. A device, comprising:
an optical module, including:
an array of pixels configured to capture image data; and
a first memory storing identification information associated with said optical module without storing calibration information for controlling said optical module;
a second memory configured to store the calibration information, the second memory located outside of the optical module; and
an interface configured to:
transmit a first request for the calibration information to a source outside the device;
receive, in response to the first request being transmitted, the calibration information from the source outside the device;
transmit a second request for updated calibration information to the source outside the device; and
receive, in response to the second request being transmitted, the updated calibration information from the source outside the device; and
at least one processor configured to:
store the calibration information in the second memory without storing the calibration information in the first memory; and
store the updated calibration information in the second memory without storing the updated calibration information in the first memory.

2. The device of claim 1, wherein said identification information uniquely identifies said optical module.

3. The device of claim 1, wherein said identification information comprises a code.

4. The device of claim 1, wherein said array of pixels comprises an array of photodiodes.

5. The device of claim 1, wherein said memory comprises a non-volatile memory.

6. The device of claim 1, wherein said optical module comprises an integrated circuit, a chip set, a die or a set of dies.

7. The device of claim 1, wherein the optical module is a component of a camera.

8. The device of claim 1 wherein the first request includes the identification information, and the second request includes the identification information and a time stamp indicating when the calibration information was received from the source outside the device.

9. An apparatus comprising:
an optical module that includes:
an array of pixels configured to capture image data; and
a memory configured to store identification information associated with said optical module;
a calibration information memory that is outside of the optical module; and
at least one processor configured to:

retrieve the identification information from the memory of the optical module;

generate a first request including the identification information retrieved from the memory of the optical module;

store calibration information in the calibration information memory, the calibration information being retrieved from a source outside the device using the first request;

retrieve the calibration information from the calibration information memory;

control the optical module using the calibration information retrieved from the calibration information memory;

generate a second request for updated calibration information, the second request including the identification information and information indicating when the calibration information was retrieved from the source outside the device; and replace the calibration information with the updated calibration information, the updated calibration information being retrieved from the source outside the device using the second request.

10. The apparatus of claim 9, further comprising:

an interface configured to transmit the first request and the second request to the source outside the device, and to receive the calibration information and the updated calibration information from the source outside the device.

11. The apparatus of claim 9, wherein said calibration information for controlling said optical module comprises one or more of:

information on a voltage to be used during operation of the array;
information on faulty pixels;
information defining how the array responds to changes in temperature;
information defining how the optical module responds to changes in color temperature of illumination;
information on shading and vignetting of the optical module;
information on color shading of said optical module;
information on optical distortion of the optical module;
information of an offset of an optical axis of the optical module;
information on a dark current of the optical module;
information on a dark current shading of the optical module;
information on image stitching;
information on depth mapping; and
information on stereoscopic alignment.

12. The apparatus of claim 9, wherein said apparatus is a mobile device.

13. A method comprising:

storing, in a first memory of an optical module for use in a device, identification information associated with said optical module, wherein said optical module comprises an array of pixels configured to capture image data;

generating a first request including the identification information;

transmitting the first request to a source outside the device;

receiving calibration information from the source outside the device based on the identification information;

storing the calibration information in a second memory of the device, the second memory being outside of the optical module;

retrieving the calibration information from the second memory; and controlling the optical module using the calibration information retrieved from the second memory;

generating, subsequent to receiving the calibration information, a second request including the identification information and information indicating when the calibration information was received;

transmitting the second request to the source outside the device;

receiving updated calibration information from the source outside the device based on the identification information and the information indicating when the calibration information was received; and updating the calibration information stored in the second memory using the updated calibration information.

14. The method as claimed in claim 13, further comprising:

storing the updated calibration information in the second memory; and using the updated calibration information for controlling the optical module.

15. The method as claimed in claim 13, wherein said calibration information comprises one or more of:

information on a voltage to be used during operation of the array;
information on faulty pixels;
information defining how the array responds to changes in temperature;
information defining how the optical module responds to changes in color temperature of illumination;
information on shading and vignetting of the optical module;
information on color shading of said optical module;
information on optical distortion of the optical module;
information of an offset of an optical axis of the optical module;
information on a dark current of the optical module;
information on a dark current shading of the optical module;
information on image stitching;
information on depth mapping; and
information on stereoscopic alignment.

* * * * *